United States Patent
Haneda et al.

(10) Patent No.: US 9,968,024 B2
(45) Date of Patent: May 15, 2018

(54) CONTROL APPARATUS FOR UTILITY MACHINE

(71) Applicant: Honda Motor Co., Ltd., Tokyo (JP)

(72) Inventors: Satoshi Haneda, Wako (JP); Ryuichi Kimata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 15/174,340

(22) Filed: Jun. 6, 2016

(65) Prior Publication Data
US 2016/0366813 A1 Dec. 22, 2016

(30) Foreign Application Priority Data

Jun. 18, 2015 (JP) ................................. 2015-122959

(51) Int. Cl.
| | | |
|---|---|---|
| A01B 69/04 | (2006.01) | |
| A01D 34/00 | (2006.01) | |
| A01G 25/16 | (2006.01) | |
| G05D 1/00 | (2006.01) | |
| G05D 1/02 | (2006.01) | |

(52) U.S. Cl.
CPC .......... *A01B 69/008* (2013.01); *A01D 34/008* (2013.01); *A01G 25/16* (2013.01); *G05D 1/0088* (2013.01); *G05D 1/0265* (2013.01); *G05D 1/0276* (2013.01)

(58) Field of Classification Search
CPC .... A01B 69/008; A01D 34/008; A01G 25/16; G05D 1/0088; G05D 1/0265; G05D 1/0276
See application file for complete search history.

(56) References Cited

U.S. PATENT DOCUMENTS

| | | | |
|---|---|---|---|
| 8,504,234 B2 * | 8/2013 | Anderson | A01G 1/00 701/24 |
| 9,692,644 B2 * | 6/2017 | Hui | H04L 41/0816 |
| 2002/0165656 A1 * | 11/2002 | Adachi | E02F 9/20 701/93 |
| 2006/0151680 A1 * | 7/2006 | Franzen | A01D 34/006 250/205 |
| 2007/0179640 A1 * | 8/2007 | Moughler | E02F 9/2045 700/36 |
| 2007/0260400 A1 * | 11/2007 | Morag | G06Q 10/00 702/1 |

(Continued)

FOREIGN PATENT DOCUMENTS

| | | |
|---|---|---|
| EP | 2342964 A1 | 7/2011 |
| JP | H0346009 A | 2/1991 |
| WO | 2015022672 A2 | 2/2015 |

*Primary Examiner* — Calvin Cheung
(74) *Attorney, Agent, or Firm* — Duft Bornsen & Fettig LLP

(57) ABSTRACT

A control apparatus for a utility machine configured to automatically work outdoors including a work actuator installed in the utility machine, a setting unit setting a time schedule of the utility machine in advance, an information acquiring unit acquiring current and future weather information for a work site or nearby, an adjusting unit adjusting the time schedule based on the weather information acquired by the information acquiring unit, and an actuator control unit controlling the work actuator so that the utility machine works in accordance with a time schedule adjusted by the adjusting unit.

14 Claims, 9 Drawing Sheets

(56) References Cited

U.S. PATENT DOCUMENTS

| | | | |
|---|---|---|---|
| 2011/0295636 A1* | 12/2011 | Anderson | G06Q 10/06311 |
| | | | 705/7.13 |
| 2012/0072322 A1* | 3/2012 | O'Neil | G06Q 10/00 |
| | | | 705/34 |
| 2012/0158915 A1 | 6/2012 | Ham et al. | |
| 2013/0046525 A1* | 2/2013 | Ali | A01B 79/005 |
| | | | 703/6 |
| 2014/0277905 A1* | 9/2014 | Anderson | G07C 5/08 |
| | | | 701/29.3 |
| 2015/0198952 A1* | 7/2015 | Einecke | G05D 1/0225 |
| | | | 134/6 |
| 2016/0071410 A1* | 3/2016 | Rupp | G06Q 50/02 |
| | | | 701/50 |
| 2016/0202679 A1* | 7/2016 | Bermudez Rodriguez | G05B 19/042 |
| | | | 700/284 |
| 2017/0020064 A1* | 1/2017 | Doughty | A01D 34/008 |

* cited by examiner

FIG. 4

PRECIPITATION PROBABILITY(%)

| TIME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| MONDAY | 10 | 10 | 10 | 10 | 10 | 10 | 10 | 20 | 20 | 20 | 20 | 20 | 20 | 0 | 0 | 0 | 0 | 0 | 0 | 0 | 0 | 0 | 0 | 0 |
| TUESDAY | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| WEDNESDAY | 30 | 30 | 30 | 30 | 30 | 30 | 30 | 30 | 30 | 30 | 30 | 30 | 30 | 50 | 50 | 50 | 50 | 50 | 50 | 50 | 50 | 50 | 50 | 50 |
| THURSDAY | 50 | 50 | 50 | 50 | 50 | 50 | 50 | 50 | 50 | 50 | 50 | 50 | 50 | 80 | 80 | 80 | 80 | 80 | 80 | 80 | 80 | 80 | 80 | 80 |
| FRIDAY | 80 | 80 | 80 | 80 | 80 | 80 | 80 | 80 | 80 | 80 | 80 | 80 | 80 | 80 | 80 | 80 | 80 | 80 | 80 | 80 | 80 | 80 | 80 | 80 |
| SATURDAY | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| SUNDAY | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 10

☆ = SELF-POSITION    AR2  AR1

| 1 | 1 | 1 |   |   |   |   |   |   |   |   |
|---|---|---|---|---|---|---|---|---|---|---|
| 1 | 1 | 1 |   |   |   |   | 1 | 1 | 1 | 1 |
| 1 | 1 | 1 |   |   |   |   | 1 | 1 | 1 | 1 |
|   |   |   | 0 | 0 | 0 | 0 | 0 |   |   |   |
|   |   |   | 0 | 0 | 0 | 0 | 0 |   |   |   |
|   |   |   | 0 | 0 | ☆ | 0 | 0 |   |   |   |
|   |   |   | 0 | 0 | 0 | 0 | 0 |   |   |   |
|   |   |   | 0 | 0 | 0 | 0 | 0 |   |   |   |
|   |   |   |   | 1 | 1 |   |   |   |   |   |
|   |   |   |   | 1 | 1 |   |   |   | 1 | 1 |
|   |   |   |   | 1 | 1 |   |   |   | 1 | 1 |

CONTROL APPARATUS FOR UTILITY MACHINE

CROSS-REFERENCE TO RELATED APPLICATION

This application is based upon and claims the benefit of priority from Japanese Patent Application No. 2015-122959 filed on Jun. 18, 2015, the content of which is incorporated herein by reference.

BACKGROUND OF THE INVENTION

Field of the Invention

This invention relates to an apparatus for controlling a utility machine so as to work outdoors automatically.

Description of the Related Art

Controllers for unmanned utility machines that perform lawn mowing or other such work in a predetermined working area are already known. The controller described in, for example, Japanese Laid-Open Patent Publication No. H3-46009 (JPH03-46009A) uses a rain sensor installed in the utility machine to detect whether it is currently raining, and when rain is detected, stops the utility machine's work operation and returns the utility machine to a parking spot.

However, since the controller described in JPH03-46009A detects current rain condition with a rain sensor installed in the utility machine, the utility machine requires a waterproof structure, which makes the structure complicated and costly.

SUMMARY OF THE INVENTION

According to an aspect of the present invention, a control apparatus for a utility machine configured to work outdoors automatically, includes: a work actuator installed in the utility machine; a setting unit configured to set a time schedule of the utility machine in advance; an information acquiring unit configured to acquire current and future weather information for a work site or nearby; an adjusting unit configured to adjust the time schedule based on the weather information acquired by the information acquiring unit; and an actuator control unit configure to control the work actuator so that the utility machine works in accordance with a time schedule adjusted by the adjusting unit.

According to another aspect of the present invention, a control method for a utility machine configured to work outdoors automatically, includes: setting set a time schedule of the utility machine in advance; acquiring current and future weather information for a work site or nearby; adjusting the time schedule based on the acquired weather information; and controlling a work actuator installed in the utility machine so that the utility machine works in accordance with the adjusted time schedule.

BRIEF DESCRIPTION OF THE DRAWINGS

The objects, features, and advantages of the present invention will become clearer from the following description of embodiments in relation to the attached drawings, in which:

FIG. 4 is an example of weather information stored in a weather information server in FIG. 1;

FIG. 10 is a diagram for explaining an example of weather forecast in a weather forecasting unit in FIGS. 1 and 7.

DETAILED DESCRIPTION OF THE INVENTION

First Embodiment

Figure 1:
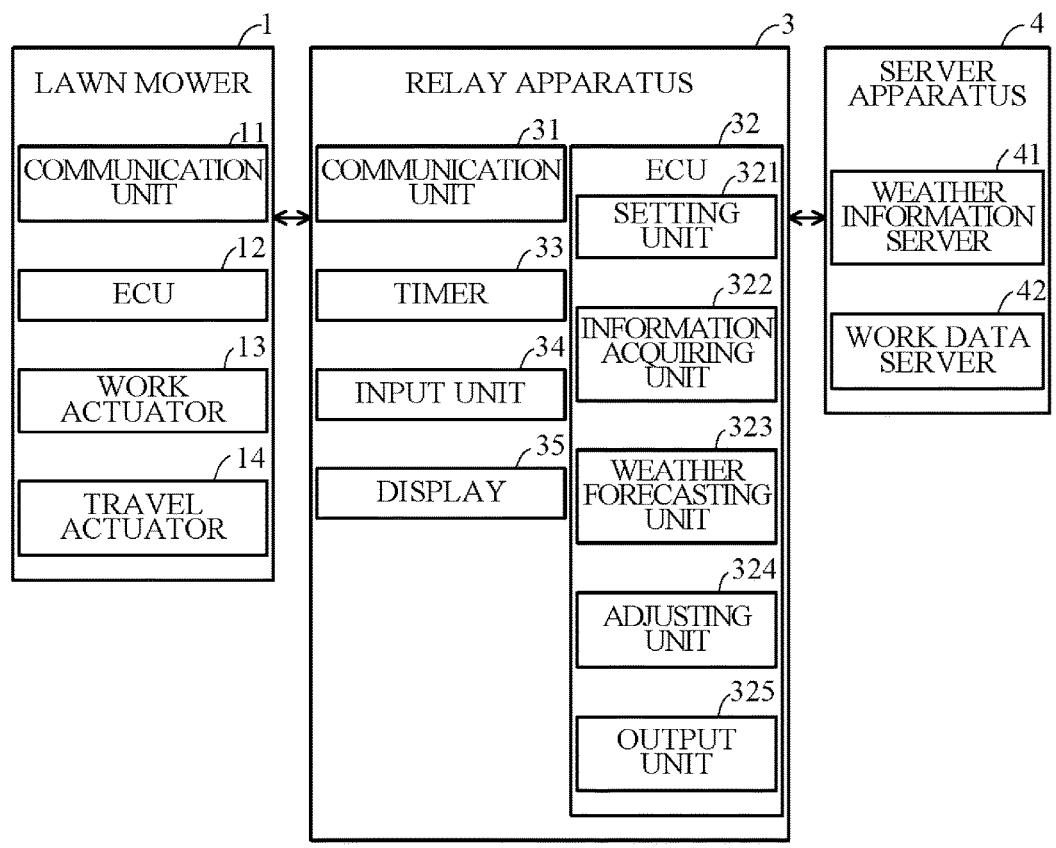
FIG. 1 is a diagram showing an overview configuration of a control apparatus for a utility machine in accordance with a first embodiment of the present invention.

Hereinafter, a first embodiment of the present invention is described with reference to FIGS. 1 to 6. FIG. 1 is a diagram showing an overview configuration of a control apparatus for a utility machine in accordance with the first embodiment of the present invention. Although the apparatus of this invention can be applied to various kinds of utility machine that can be operated outdoors automatically, in the first embodiment is applied particularly to a traveling lawn mower 1 that performs lawn mowing work while navigating autonomously.

As shown in FIG. 1, a relay apparatus 3 is communicatively connected to the lawn mower 1 and a server apparatus 4 is communicatively connected to the relay apparatus 3. The lawn mower 1 is deployed on a lawn within a property and the relay apparatus 3 is deployed in a building on the same property, and the two are enabled to communicate through a wireless LAN or similar. The relay apparatus 3 and the server apparatus 4 can communicate through the Internet or other communications network. The relay apparatus 3 can be configured using a personal computer, mobile telephone terminal or the like. The relay apparatus 3 functions as a base station, and signals including various data, control signals and the like can be sent and received between the server apparatus 4 and the lawn mower 1 via the relay apparatus 3.

The lawn mower 1 is equipped with a communication unit 11, ECU 12, work actuator 13 and travel actuators 14, and is configured to navigate autonomously within a predetermined working area. The structure of the traveling lawn mower 1 is explained in detail in the following.

Figure 2:
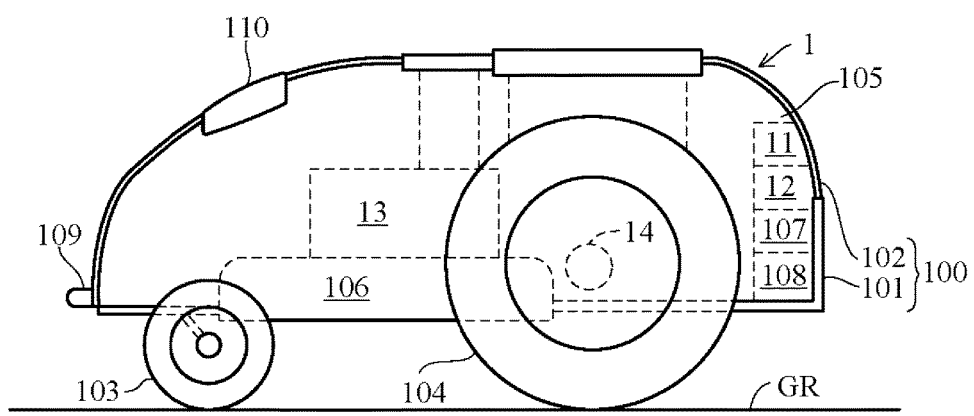
FIG. 2 is a side view showing a principal configuration of a lawn mower in FIG. 1.

FIG. 2 is a side view showing the principal components of the lawn mower 1. As shown in FIG. 2, the lawn mower 1 is equipped with a body 100 having a chassis 101 and a frame 102, along with a pair of left and right front wheels 103 and pair of left and right rear wheels 104 that support the body 100 above a ground surface GR so as to be capable of travel. The communication unit 11, the ECU 12, a work unit 106, the work actuator 13 (work motor) for driving the work unit, the travel actuators 14 (travel motors) for driving the rear wheels, a battery charging unit 107, and a battery 108 are installed in an interior space 105 of the lawn mower 1 enclosed by the chassis 101 and frame 102. The ECU 12 is constituted to include an arithmetic processing unit having, inter alia, a central processing unit (CPU), a read-only memory (ROM), a random access memory (RAM) and other peripheral circuits.

The communication unit 11 includes a transmitting-and-receiving antenna and a signal processing circuit for processing transmitted and received signals, and the ECU 12 can communicate with the relay apparatus 3 through the communication unit 11. The work unit 106 has rotatable lawn mowing blades. A vertically oriented rotating shaft is provided at the center of the blades of the work unit 106 and the blades are rotated by the work actuator 13. The work actuator 13 is constituted by an electric motor. The travel actuators 14 are constituted by a pair of electric motors installed on the right and left inner sides of the left and right rear wheels 104. Output shafts of the travel actuators 14 are connected to rotating shafts of the left and right rear wheels 104, respectively, so that the travel actuators 14 independently drive (rotate) the left and right rear wheels 104. By establishing a difference between the rotating speeds of the left and right rear wheels 104, the lawn mower 1 can be turned to an arbitrary direction The charging unit 107 is connected through wires to terminals 109 provided at the front end of the frame 102 and is also connected through wires to the battery 108. The battery 108 is charged by connecting the terminals 109 through contacts to a charging station 6 (see FIG. 3). The battery 108 is connected through wires to the work actuator 13 and the travel actuators 14, and the actuators 13 and 14 are driven by power supplied from the battery 108. Two magnetic sensors 110 are installed laterally spaced apart on the front end of the lawn mower 1 (see FIG. 3). The magnetic sensors 110 output signals indicating magnetic field magnitude (magnetic field strength).

Although omitted in the drawing, the lawn mower 1 is further equipped with, inter alia, a Yaw sensor, a G sensor, a direction sensor, a contact sensor, wheel speed sensors, and a voltage sensor. The Yaw sensor outputs a signal indicating angular velocity (yaw rate) occurring around a height direction (z-axis) of the lawn mower 1. The G sensor is an acceleration sensor that outputs a signal indicating acceleration acting on the lawn mower 1 in the directions of three orthogonal axes (x-axis, y-axis, and z-axis). The direction sensor (geomagnetic field sensor) outputs a signal related to terrestrial magnetism. The contact sensor outputs an ON signal when the lawn mower 1 approaches or makes contact with an obstacle or the like. The wheel speed sensors output signals indicating the wheel speeds of the left and right rear wheels 104. The voltage sensor outputs a signal indicating the residual voltage of the battery 108.

Figure 3:
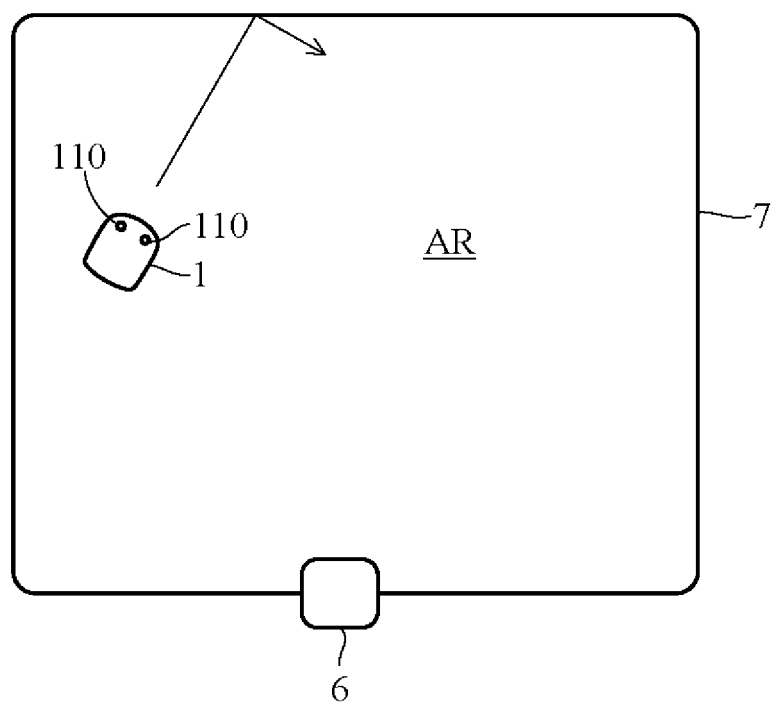
FIG. 3 is a plan view showing a working area for the lawn mower in FIG. 1.

The lawn mower 1 configured as above performs work while autonomously navigating within a predefined working area. FIG. 3 is a plan view showing a working area AR. The working area AR is delineated by a boundary wire 7 laid beforehand (e.g., buried a predetermined depth under the ground surface GR) in a garden (lawn), for example, and the boundary wire 7 defines the travel range of the lawn mower 1. A magnetic field is generated in the working area AR by passing electric current through the boundary wire 7. Magnetic field strength in the working area AR is detected by the magnetic sensors 110.

Magnetic field strength varies in accordance with distance from the boundary wire 7. The ECU 12 uses signals from the magnetic sensors 110 to determine whether the lawn mower 1 has arrived at the boundary wire 7. When arrival at the boundary wire 7 is determined, control signals are output to the travel actuators 14 to turn the lawn mower 1 toward the inside of the working area AR as indicated by an arrow in FIG. 3. In this manner, the ECU 12 outputs control signals to the travel actuators 14 in accordance with signals from the magnetic sensors 110, whereby the lawn mower 1 travels autonomously inside the working area AR. At this time, the ECU 12 also outputs a control signal to the work actuator 13 in order to automatically perform lawn mowing work inside the working area AR.

The charging station 6 for charging the battery 108 is installed above the boundary wire 7. When the voltage sensor detects that voltage of the battery 108 is too low during work, the ECU 12 outputs control signals to the travel actuators 14 so as to return the lawn mower 1 to the charging station 6, along the boundary wire 7, for example, and then charge the battery 108. When charging of the battery 108 is finished, the ECU 12 outputs control signals to the travel actuators 14 so as to separate the lawn mower 1 from the charging station 6 and thereafter drives the work actuator 13 to resume work. The ECU 12 also returns the lawn mower 1 to the charging station 6 upon work completion and keeps it standing by at the charging station 6 until the next work is started. The charging station 6 is equipped with a cover for sheltering the lawn mower 1 parked at the charging station 6 from the weather (wind and rain, etc.). Alternatively, the lawn mower 1 can be protected from the weather by providing a cover over the area where the charging station 6 is located.

A time schedule of work processes to be performed by the lawn mower 1 is set in the relay apparatus 3, and the lawn mower 1 commences work and terminates work in accordance with commands from the relay apparatus 3. Specifically, the relay apparatus 3, which has a timer, sends a work-start command through the communication unit 11 to the lawn mower 1 at the scheduled time for starting work and later similarly sends a work-stop command at the scheduled time for stopping work. The ECU 12 controls the actuators 13 and 14 to start lawn mowing work upon receiving a work-start command and to stop lawn mowing work upon receiving a work-stop command. Therefore, the ECU 12 functions as an actuator control unit to output control signals to the actuator 13 and 14 in accordance with a work command. As a result, all that is required to have the lawn mower 1 perform work automatically at desired times is for the user to enter a time schedule beforehand.

The lawn mower 1 works outdoors, so that from the viewpoint of preventing damage to its equipment and ensuring efficient work performance, it is preferable to avoid lawn mowing work during rain or the like. Although this point can be dealt with by equipping the lawn mower 1 with a sensor for detecting rain and terminating work when rainfall is detected, this requires the lawn mower 1 to have a watertight structure resistant to rainfall around the ECU 12 and the sensors. As a result, the lawn mower 1 becomes structurally complicated and high in cost. On the other hand, an arrangement that requires the user to keep an eye on the weather forecast and input commands to adjust the time schedule is troublesome for the user. The control apparatus for a utility machine of the present embodiment is therefore configured as below so that the utility machine (lawn mower 1) is operated to perform work suitably taking weather changes into account, without need for a sensor or the like for detecting rain and while saving the work of revising a time schedule for the user.

As shown in FIG. 1, the relay apparatus 3 includes a communication unit 31, ECU 32, timer 33, input unit 34, and display 35. The communication unit 31 includes a communication section communicatively connected to the lawn mower 1 through a wireless LAN or other communication device, and a communication section communicatively connected to the server apparatus 4 via Internet communication by means of an optical communication path or the like. The ECU 32 is constituted to include an arithmetic processing unit having, inter alia, a CPU, ROM, RAM and other peripheral circuits. The input unit 34 includes a keyboard, mouse, touch panel and other operating units that enable input of various information to the relay apparatus 3 through the input unit 34. The display 35 includes a device for visually representing various information.

The server apparatus 4 includes a weather information server 41 that stores weather information for individual regions and a work data server 42 that stores work data of the utility machine (lawn mower 1). The weather information server 41 stores current and future weather information, more specifically, weather information for individual time periods between the present and predetermined times in the future. The weather information stored in the weather information server 41 includes precipitation probability, temperature, humidity, sunrise time, sunset time, wind speed and the like, and such weather information is updated at predetermined intervals (for example, every 5 minutes).

FIG. 4 is an example of weather information stored in the weather information server 41. FIG. 4 shows precipitation probability (%) data. The current time is Monday 0 AM and, as shown in FIG. 4, the weather information server 41 stores hourly precipitation probability data of a given region for a period of one week (from the present to a week later). The work data stored in the work data server 42 include data on work performed in the past (work history data) by the lawn mower 1 and information on the user of the lawn mower 1. The work history data is sent from the ECU 12 to the work data server 42 through the relay apparatus 3 after the lawn mower 1 finishes the work.

As shown in FIG. 1, the ECU 32 of the relay apparatus 3 has as functional constituents a setting unit 321, an information acquiring unit 322, a weather forecasting unit 323, an adjusting unit 324, and an output unit 325.

The setting unit 321 establishes a time schedule (of work processes) of the lawn mower 1 in advance. For example, it sets scheduled work dates, work-start times, work-stop times and the like. When work is performed periodically, the period can be defined. The user can use the input unit 34 to set a time schedule as desired. A time schedule can also be established referring to information acquired from the work data server 42 by the information acquiring unit 322. It is also possible to automatically arrange a time schedule using information (for example, sunrise and sunset times) acquired by the information acquiring unit 322 from the weather information server 41. The setting unit 321 defines weather conditions under which work is to be prohibited (work-prohibit conditions). For example, when work is to be prohibited during rain, "rain" is designated as a work-prohibit condition.

The information acquiring unit 322 acquires current and future weather information for the work site from the weather information server 41 through the communication unit 31, more specifically, acquires weather information covering from the present to a predetermined time in the future. When the weather information server 41 does not have weather information for the work site, weather information for a location near the work site is acquired. When weather information is available for a number of sites near the work site whose weather information is to be supplied, weather information can be acquired for those sites. The information acquiring unit 322 also acquires work data from the work data server 42.

The weather forecasting unit 323 uses the weather information acquired by the information acquiring unit 322 to forecast weather at the work site for a period extending from the present to a predetermined time in the future. The forecast weather conditions are ones corresponding to the work-prohibit conditions set in the setting unit 321, and for example, whether or not rain will fall at the work site is forecast based on the precipitation probability data. When weather information is acquired not for the work site but for other sites in the neighborhood, weather at the work site is forecast using that weather information.

The adjusting unit 324 adjusts the time schedule in accordance with the weather forecast by the weather forecasting unit 323. For example, when rain is defined as a work-prohibit condition and the weather forecasting unit 323 forecasts rain, the time schedule is adjusted to prohibit work during the time period that rain is expected.

Figure 5:
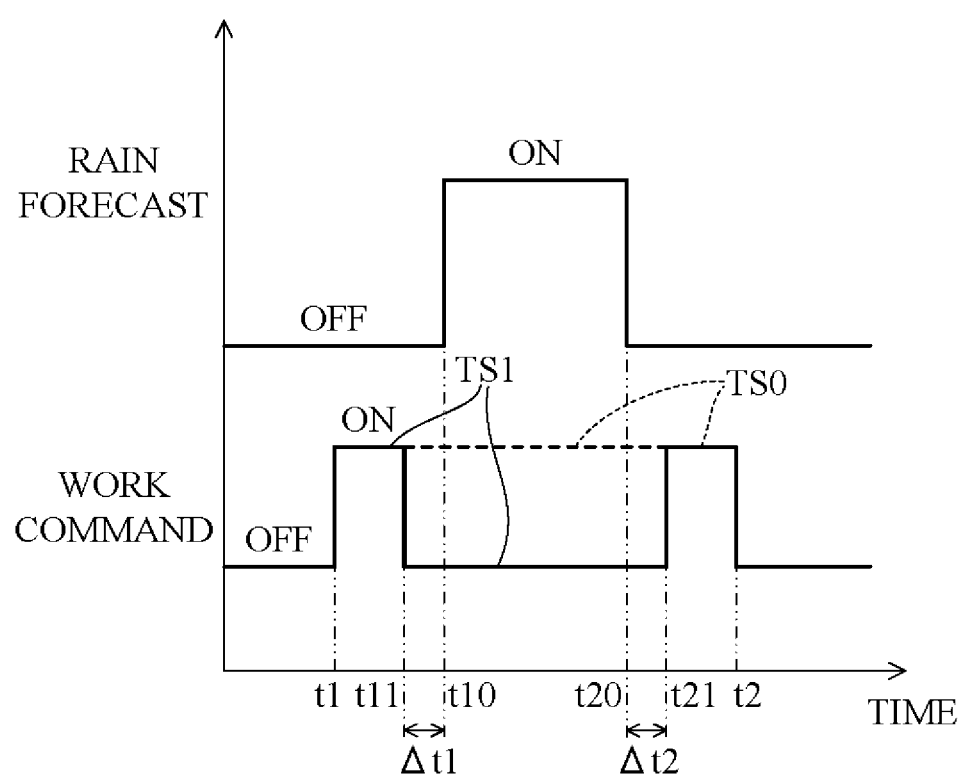
FIG. 5 is a diagram showing an example of a time schedule for the lawn mower in FIG. 1.

FIG. 5 is a diagram showing an example of a time schedule before and after adjustment. In FIG. 5, work commands according to the time schedule for implementing work and terminating work are indicated by ON and OFF, respectively. The time schedule before adjustment is designated by TS0 (a dotted line) and the time schedule after adjustment by TS1 (a solid line). In this example, as indicated by TS0 in FIG. 5, the setting unit 321 sets the work command in advance to be ON during a time period from time t1 (sunrise) to time t2 (sunset). In other words, the time schedule (TS0) is set to perform work from sunrise to sunset. The time schedule is therefore automatically modified to reflect changing sunrise and sunset times with changing seasons.

If the weather forecasting unit 323 then forecasts rain between time t10 and time t20, the adjusting unit 324 acts to prohibit work during this time period by changing the work command from ON (the dotted line) to OFF (the solid line), as indicated by TS1. In the particular example of FIG. 5, the adjusting unit 324 actually turns the work command OFF from time t11 preceding forecast rain start time t10 by a predetermined time period Δ1 until time t21 following forecast rain stop time t20 by a predetermined time period Δ2.

The output unit 325 complies with the time schedule (TS1) adjusted by the adjusting unit 324 by outputting work-start and work-stop commands to the lawn mower 1 through the communication unit 31. Specifically, while tracking current time with the timer 33, it outputs work-start commands at the times when the work command changes from OFF to ON and outputs work-stop commands at the times when it changes from ON to OFF. In the case shown in FIG. 5, for example, it outputs work-start commands at time t1 and time t21 and work-stop commands at time t11 and time t2. The output work-start commands and work-stop commands are sent to the lawn mower 1 through the communication unit 31.

Upon output of a work-start command from the relay apparatus 3 (output unit 325), the ECU 12 of the lawn mower 1 outputs control signals to the travel actuators 14 so as to move the lawn mower 1 away from the charging station 6 into the working area AR. Following this, the ECU 12 outputs control signals to the work actuator 13 and the travel actuators 14, whereby the lawn mower 1 performs work while traveling in the working area AR. Upon output of a work-stop command from the relay apparatus 3, the ECU 12 outputs control signals to the work actuator 13 to stop work and to the travel actuators 14 to return the lawn mower 1 to the charging station 6.

Figure 6:
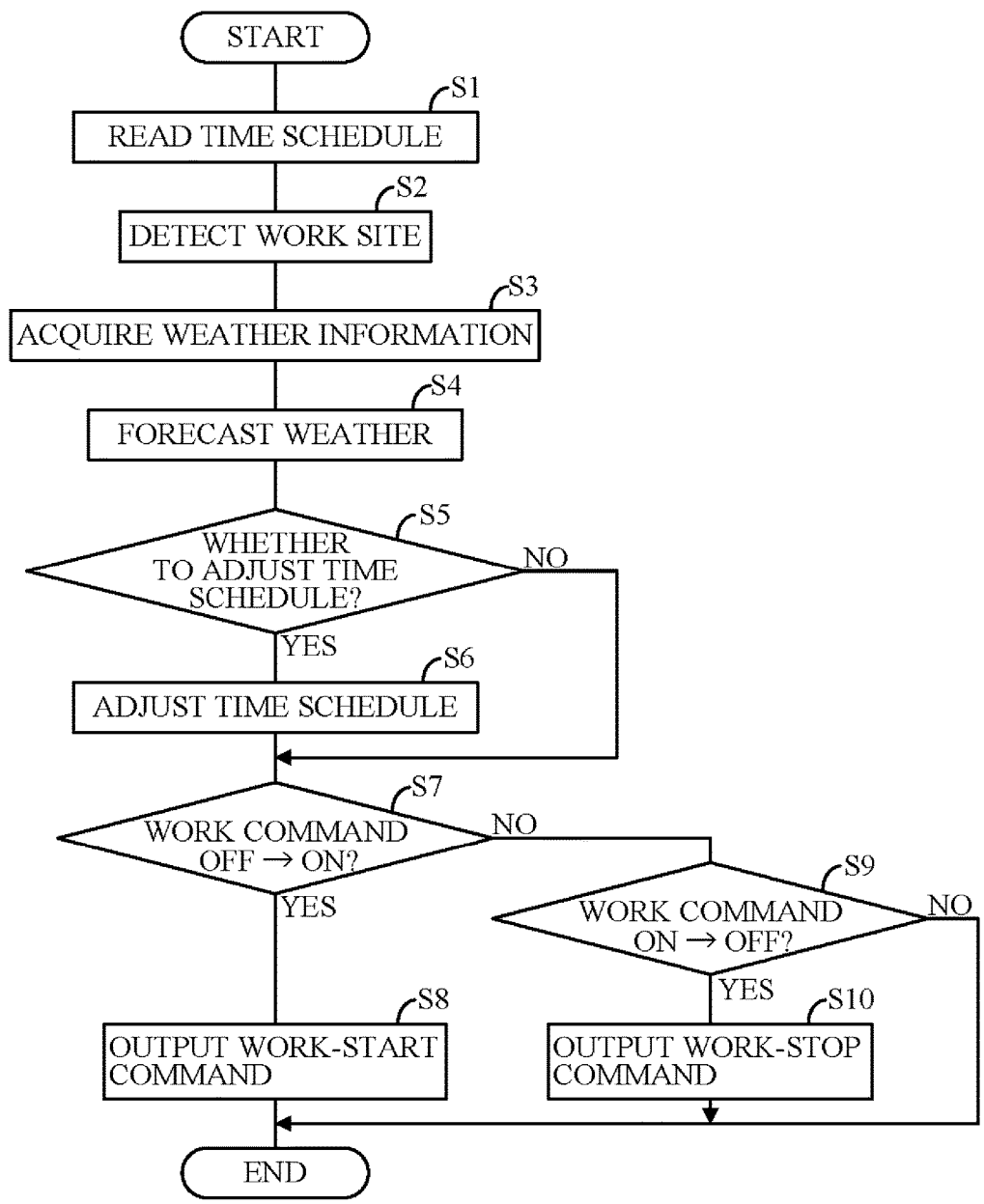
FIG. 6 is a flowchart showing an example of processing executed by an ECU of a relay apparatus in FIG. 1.

FIG. 6 is a flowchart showing an example of processing executed by the ECU 32 of the relay apparatus 3. The relay apparatus 3 commences the processing of FIG. 6 when, for example, a control start command is issued after the relay apparatus 3 is started. This processing is repeatedly executed at predetermined time intervals.

First, in S1, the time schedule (TS0) established in advance by the setting unit 321 is read (S: processing Step). Next, in S2, the locations of the x-coordinate and y-coordinate in the global coordinate system (own position) of the lawn mower 1, i.e., the work site, are detected. For example, when the lawn mower 1 and the relay apparatus 3 are on the same property, the location (address) where the relay apparatus 3 is present is taken as the location of the lawn mower 1 and thus detected as the work site location. Alternatively, the lawn mower 1 can be provided with a GPS or other position sensor and the work site detected using a signal from the position sensor.

Next, in S3, the information acquiring unit 322 performs processing by which weather information for the work site or nearby is acquired from the server apparatus 4 (weather information server 41). In S3, instead of acquiring all weather information, it is alternatively possible, as shown in FIG. 4, to acquire only weather information corresponding to the work-prohibit conditions (rain), i.e., precipitation probability data, for a predetermined period (one week into the future). The acquired weather information is updated and stored in the memory of the relay apparatus 3 whenever necessary.

Next, in S4, the weather forecasting unit 323 performs processing by which weather (rain/no rain) at the work site is forecast. For example, rain is forecast when the precipitation probability is 40% or higher. Next, in S5, the adjusting unit 324 performs processing by which whether to adjust the time schedule is decided based on the weather forecast in S4. For example, when rain is predicted for a time period when the work command is ON, it is decided that the time schedule needs to be adjusted to prohibit work during rain.

When the result in S5 is YES, the program goes to S6, and when NO, skips S6 and goes to S7. In S6, the adjusting unit 324 performs processing by which the time schedule is adjusted, for example, as indicated by solid line TS1 of FIG. 5. Specifically, the work command is turned OFF from time t11 preceding forecast rain start time t10 by a predetermined time period Δ1 until time t21 following forecast rain stop time t20 by a predetermined time period Δ2.

In S7, the output unit 325 performs processing for discriminating whether the current time tracked by the timer 33 reached a time when the work command changes from OFF to ON (time t1 or t21 in FIG. 5). In this case, when the time schedule is adjusted in S6, whether work command has changed to ON is discriminated using the adjusted time schedule (TS1), and when the time schedule is not adjusted, whether work command has changed to ON is discriminated using the initial time schedule (TS0). When the result in S7 is YES, the program goes to S8, in which the output unit 325 performs processing by which a work-start command is output. This work-start command is sent to the ECU 12 of the lawn mower 1 through the communication units 11 and 31, whereby the lawn mower 1 moves from the charging station 6 to the working area AR and then starts work.

On the other hand, when the result in S7 is NO, the program goes to S9, in which the output unit 325 performs processing for discriminating whether the current time tracked by the timer 33 has reached a time when the work command changes from ON to OFF (time t11 or t2 in FIG. 5). In this case, when the time schedule is adjusted in S6, whether work command has changed to OFF is discriminated using the adjusted time schedule (TS1), and when the time schedule is not adjusted, whether work command has changed to OFF is discriminated using the initial time schedule (TS0). When the result in S9 is YES, the program goes to S10, in which the output unit 325 performs processing by which a work-stop command is output. This work-stop command is sent to the ECU 12 of the lawn mower 1 through the communication units 11 and 31, whereby the lawn mower 1 stops work and returns to the charging station 6. When the result in S9 is NO, processing is terminated.

The first embodiment can achieve the following advantages and effects.

(1) The control apparatus for a utility machine according to the first embodiment is configured to automatically work outdoors, and includes the work actuator 13 installed in the lawn mower 1 (a utility machine), the setting unit 321 for setting the time schedule (TS0) of the lawn mower 1 in advance, the information acquiring unit 322 for acquiring current and future weather information for the work site or nearby, the adjusting unit 324 for adjusting the time schedule (TS0) based on the weather information acquired by the information acquiring unit 322, and the ECU 12 (an actuator control unit) for controlling the work actuator 13 so that the lawn mower 1 works in accordance with the time schedule (TS1) adjusted by the adjusting unit 324 (FIG. 1).

As a result, the lawn mower 1 can be operated to perform work suitably taking weather changes into account, without need to equip the lawn mower 1 with a sensor or the like for detecting rain and while saving the work of adjusting a time schedule for the user. Therefore, the lawn mower 1 does not require a special structure (for example, watertight structure) capable of standing the weather such as rain and wind, and can perform work with a simple and low-cost structure under a weather condition suitable to lawn mowing work, in other words, while taking weather changes into account.

(2) Since the information acquiring unit 322 acquires the weather information from the weather information server 41 (a server) through network communication (S3), it is possible to accurately forecast constantly varying weather. Therefore, the time schedule of the lawn mower 1 can be optimally adjusted in line with the weather information and work can be reliably prohibited under rainy and other work-prohibit conditions.

(3) The control apparatus for the utility machine further includes the weather forecasting unit 323 that forecasting current and future weather at the work site based on weather information acquired by the information acquiring unit 322, and the adjusting unit 324 adjusts the time schedule in accordance with the weather forecast by the weather forecasting unit 323 (S6). Therefore, in a case where, for example, "rain" is defined as a work-prohibit condition estimated from precipitation probability acquired from the weather information server 41 as weather information, i.e., even in a case where a weather condition (rain) corresponding to a work-prohibit condition cannot be directly acquired from the acquired weather information (precipitation probability), the time schedule can nevertheless be adjusted to reflect a desired work-prohibit weather condition because a weather condition corresponding to a work-prohibit condition can be forecast.

(4) The weather forecasting unit 323 forecasts rain or no rain at the work site, and the adjusting unit 324 adjusts the time schedule so as to prohibit work by the lawn mower 1 during time periods rain is forecast by the weather forecasting unit 323 (S6). Therefore, since lawn mowing work is prohibit during rain, damage to equipment can be prevented and the lawn mower 1 can work efficiently.

(5) The weather forecasting unit 323 forecasts the rain start time t10 at the work site, and the adjusting unit 324 adjusts the time schedule so as to prohibit work by the lawn mower 1 from a predetermined time period Δ1 before the rain start time t10 forecast by the weather forecasting unit 323 (FIG. 5). This makes it possible to complete work before rain falls and reliably prevent work during rain.

(6) The weather forecasting unit 323 forecasts the rain stop time t20 at the work site, and the adjusting unit 324 adjusts the time schedule so as to prohibit work by the lawn mower 1 until a predetermined time period Δ2 elapses after the rain stop time t20 forecast by the weather forecasting unit 323 (FIG. 5). This makes it possible to perform work when lawn mowing condition becomes favorable after the rain stops, thus enabling improvement of work efficiency.

(7) The control apparatus for the utility machine includes the relay apparatus 3 that communicates with the lawn mower 1 (a utility machine) through the communication units 11 and 31, and the relay apparatus 3 includes the setting unit 321, the information acquiring unit 322, the adjusting unit 324, and the output unit 325 that outputs work command (the work-start command and work-stop command) to the lawn mower 1 through the communication unit 11 and 31, and the ECU 12 (an actuator control unit) outputs a control signal to the actuators 13 and 14 in accordance with the work command output from the output unit 325 (FIG. 1). Therefore, the relay apparatus 3 different from the lawn mower 1 is used to perform various processing such as adjusting of the time schedule or the like, whereby it is possible to simplify the configuration of a utility machine.

(8) The control apparatus for the utility machine is applied to the lawn mower 1 having the travel actuator 14, and the ECU 12 controls the work actuator 13 and the travel actuator 14 so that the lawn mower 1 travels autonomously and mows a lawn in the predetermined working area AR, in accordance with the time schedule (TS1) adjusted by the adjusting unit 324. Therefore, the lawn mower 1 can be sheltered at a place safe from rain and wind when not working and thus be protected against equipment damage.

Second Embodiment

Figure 7:
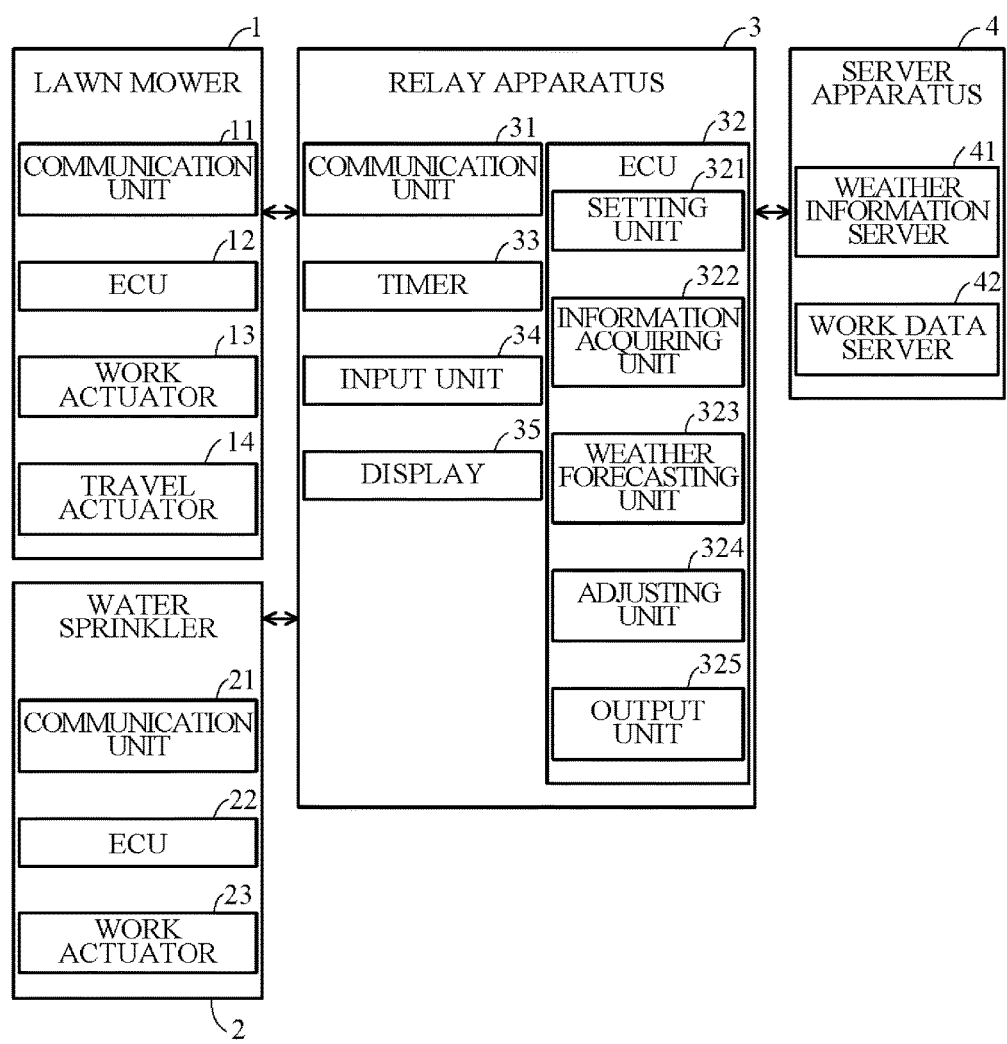
FIG. 7 is a diagram showing an overview configuration of a control apparatus for a utility machine in accordance with a second embodiment of the present invention.
Figure 8:
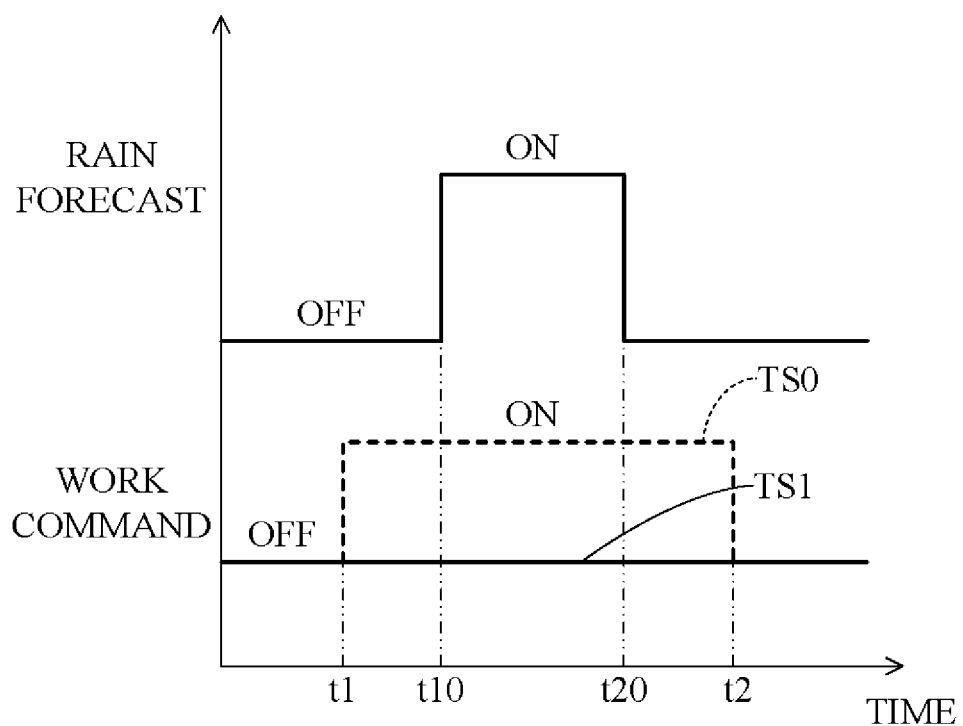
FIG. 8 is a diagram showing an example of a time schedule for the water sprinkler in FIG. 7.
Figure 9:
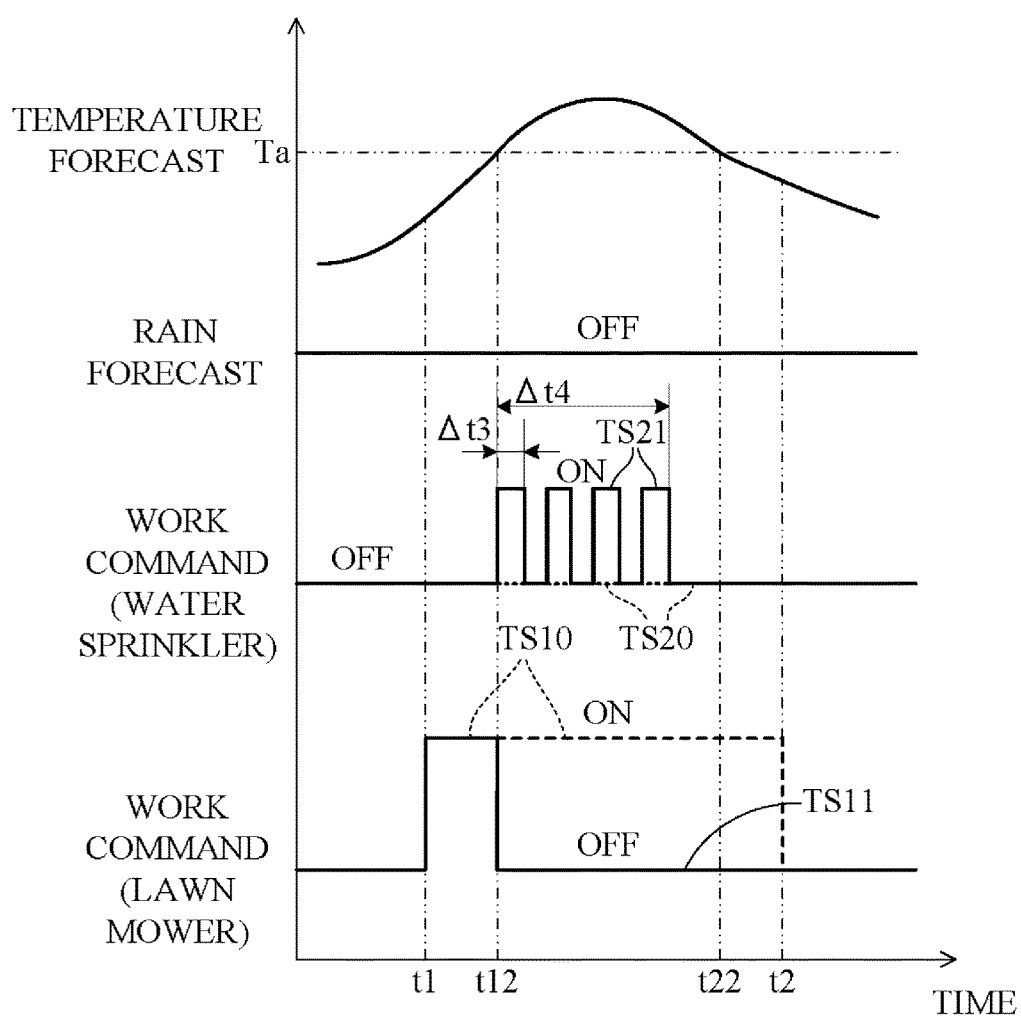
FIG. 9 is a diagram showing a modification of FIG. 8.

Referring to FIGS. 7 to 9, a second embodiment of the present invention is described. Although the lawn mower 1 is used as the utility machine for working outdoors automatically in the first embodiment, a lawn mower and a water sprinkler are used in the second embodiment. FIG. 7 is a diagram showing an overview configuration of a control apparatus for a utility machine in accordance with the second embodiment of the present invention. Constituents the same as those in FIG. 1 are assigned the same symbols as in FIG. 1, and the following explanation relates chiefly to points of difference from the first embodiment.

As shown in FIG. 7, a water sprinkler 2 has a communication unit 21, an ECU 22, and a work actuator 23. The water sprinkler 2 is deployed on the same property as the lawn mower 1 and the relay apparatus 3, for example, in the working area AR or nearby.

The water sprinkler 2 is connected to a water source through a pipe and can sprinkle water in a predetermined outdoor area (for example, the working area AR) from a nozzle at its tip. The work actuator 23 is an electromagnetic valve that communicates or cuts off the water source with or from the nozzle, and water sprinkling work is performed when the electromagnetic valve is open (when ON) and water sprinkling work stops when the electromagnetic valve is closed (when OFF). Opening and closing of the electromagnetic valve is controlled by the ECU 22. The ECU 22 opens the electromagnetic valve when a work-start command is output from the relay apparatus 3 and closes the electromagnetic valve when a work-stop command is output.

The relay apparatus 3 performs the processing shown in FIG. 6 also with respect to the water sprinkler 2. Specifically, the relay apparatus 3 forecasts weather at the work site using weather information acquired from the weather information server 41, adjusts the time schedule based on the forecast result, and outputs work-start commands and work-stop commands in accordance with the adjusted time schedule.

FIG. 8 is a diagram showing an example of the time schedule of the water sprinkler 2. In FIG. 8, as in FIG. 5, the time schedule before adjustment is designated by TS0 (a dotted line) and the time schedule after adjustment by TS1 (a solid line). As indicated by the broken line in FIG. 8, the setting unit 321 sets the initial time schedule of the water sprinkler 2 so as to set the work command ON during a time period from time t1 (sunrise) to time t2 (sunset).

If the weather forecasting unit 323 then forecasts rain between time t10 and time t20, the adjusting unit 324 turns OFF all of that day's work commands, as indicated by the solid line in FIG. 8. In other words, the time schedule is adjusted so as not to perform any water sprinkling on that day because the need for water sprinkling is low throughout a day when rain falls. Alternatively, the time schedule can be adjusted so that all water sprinkling work is prohibited on a day when a forecast time period between rain start and stop is equal to or greater than a predetermined time period and water sprinkling work is performed except during rain when it is smaller than the predetermined time period. The output unit 325 complies with the adjusted time schedule by outputting work-start and work-stop commands to the water sprinkler 2, whereby water sprinkling work is carried out automatically.

Thus the control apparatus for a utility machine according to the second embodiment includes the work actuator 23 installed in the water sprinkler 2 (a utility machine), the setting unit 321 for setting the time schedule (TS0) of the water sprinkler 2 in advance, the information acquiring unit 322 for acquiring current and future weather information for the work site or nearby, the adjusting unit 324 for adjusting the time schedule (TS0) based on the weather information acquired by the information acquiring unit 322, and the ECU 22 (an actuator control unit) for controlling the work actuator 23 so that the water sprinkler 2 works in accordance with the time schedule (TS1) adjusted by the adjusting unit 324.

Therefore, similarly to in the first embodiment, the water sprinkler 2 can be operated to perform work suitably taking weather changes into account, without need to equip the water sprinkler 2 with a sensor or the like for detecting rain and while saving the work of adjusting a time schedule for the user. Provision of a sensor for detecting rain makes a watertight structure necessary at least around the sensor but no such need arises in the second embodiment, so that work can be performed while taking weather changes into account with a simple and low-cost structure.

In the second embodiment, the lawn mower 1 and the water sprinkler 2 are both operated under the control of commands from the relay apparatus 3, and when the lawn mower 1 and the water sprinkler 2 are operated simultaneously, the time schedule of either can be adjusted in accordance with the time schedule of the other. For example, the time schedule of the water sprinkler 2 can be adjusted in view of the time schedule of the lawn mower 1 so that the work command of the water sprinkler 2 is OFF when the work command of the lawn mower 1 is ON. Alternatively, the time schedule of the lawn mower 1 can be adjusted in view of the time schedule of the water sprinkler 2 so that the work command of the lawn mower 1 is OFF when the work command of the water sprinkler 2 is ON. This makes it possible to prevent performance of lawn mowing work during water sprinkling work or performance of water sprinkling work during lawn mowing work.

In the above embodiments, time schedules are adjusted by changing work commands of time schedules set in advance from ON to OFF using weather information, but it is also possible to the contrary to adjust the time schedules by changing work commands for OFF to ON. FIG. 9 is a diagram showing an example of a water sprinkler 2 time schedule set in this manner. FIG. 9 also shows an accompanying example of a lawn mower 1 time schedule.

In FIG. 9, a time schedule of the water sprinkler 2 is established to set a work command OFF (TS20) in advance, and a time schedule of the lawn mower 1 is established to set a work command ON from sunrise time t1 to sunset time t2 (TS10). In a rain forecast OFF condition (forecast of no rain), when a forecast temperature at the work site acquired from the weather information server 41 is equal to or higher than a predetermined temperature Ta (for example, 10° C.) at time t12, the work command of the water sprinkler 2 is turned ON as shown in TS21 (solid line) of the drawing.

In this case, the work command is not kept constantly ON but is repeatedly set ON and OFF at a predetermined time interval. For example, the work command is alternately set ON and OFF at a predetermined time interval $\Delta t3$ (for example, every 30 min) throughout a predetermined maximum time period $\Delta t4$ (for example, four hours). Alternatively, if the forecast temperature falls below the predetermined temperature Ta before the predetermined maximum time period $\Delta t4$ elapses, the work command of the water sprinkler 2 can be turned OFF at that time t22. The adjustment of time schedule in this manner to set the work command of the water sprinkler 2 ON when forecast temperature becomes equal to or higher than predetermined temperature Ta enhances water sprinkling work efficiency. For example, when a high-temperature and dry weather continues for a predetermined time period, the water sprinkling time schedule can be changed to sprinkle water proactively. Alternatively, the work command can be turned ON in response to humidity instead of temperature.

Modifications

In the above embodiments, the weather forecasting unit 323 forecasts rain when the precipitation probability obtained from the weather information server 41 is equal to or greater than a predetermined value (40%), but the weather forecast method is not limited to this. FIG. 10 is a X-Y plan view along a horizon plane for explaining another weather forecast method. In FIG. 10, a utility machine (for example, lawn mower 1) is present in the middle of an area and a geographical map having a predetermined grid interval (for example, 10 km interval) is generated around this utility machine location.

In this modification, the relay apparatus 3 performs the same processing as in FIG. 6, but in S3, is distinctive in that rain cloud information is acquired for a predetermined distance around the self-position (for example, within 50 km), and in the map of FIG. 10, a region with rain clouds is assigned N=1 and a region with no rain clouds N=0. Further, in S4, rain or no rain is predicted separately for a first area AR1 within a first predetermined distance (for example, 15 km) from the own-position and for a second area AR2 within a broader second predetermined distance (for example, 25 km) from the own-position. In this rain forecast, the sum total of N within a predetermined time period (for example, 1 hour) in each of the first area AR1 and second area AR2 is calculated and rain is predicted when the sum total of N of the first area is equal to or greater than a predetermined value (for example, 3) or the sum total of N of the second area is equal to or greater than a predetermined value (for example, 6).

In the second embodiment, the lawn mower 1 and water sprinkler 2 are provided with the ECUs 12 and 22, which control driving of the work actuators 13 and 23 in accordance with commands from the relay apparatus 3, but it is possible instead to implement the functions of the ECUs 12 and 22 in the relay apparatus 3 and omit the ECUs 12 and 22 from the lawn mower 1 and water sprinkler 2. It is also possible to omit either the ECU 12 from the lawn mower 1 or the ECU 22 from the water sprinkler 2.

In the second embodiment, the lawn mower 1 and the water sprinkler 2 are used as utility machines, but it is alternatively possible to use only one of the lawn mower 1 and the water sprinkler 2 as a utility machine. Moreover, the present invention can be applied not only to the lawn mower 1 and water sprinkler 2 but also similarly to other utility machines that permit or prohibit work depending on the weather. Therefore, the actuator installed in a utility machine is not limited to the one mentioned in the foregoing. The timer 33 and setting unit 321 provided in the relay apparatus 3 in the embodiments described above can instead be provided in the lawn mower 1, water sprinkler 2 or elsewhere. In such case, the timer 33 or setting unit 321 can be omitted from the relay apparatus 3.

In the above embodiments, the time schedule of the utility machine 1 or 2 is set by the setting unit 321 of the relay apparatus 3, but it can instead be set by the ECU 12 or 22 of the utility machine 1 or 2. Therefore, the configuration of a setting unit is not limited to the above configuration. In the above embodiments, the weather information server 41 and the work data server 42 are provided in the server apparatus 4, but the configuration of a server is not limited to this. In the above embodiments, the information acquiring unit 322 acquires weather information covering from the present to a predetermined time in the future for the work site and vicinity from the weather information server 41. In other words, it acquires weather information from a server by means of network communication, but the configuration of an information acquiring unit is not limit to this. For example, it is possible instead for the information acquiring unit to acquire not only present and future weather information but also past weather information and for the adjusting unit 324 to adjust the time schedule based on the acquired past, present and future weather information. Therefore, the time schedule can be suitably adjusted taking past rainfall level (e.g., amount of rainfall per hour) into account, thereby enabling more efficient work.

In the above embodiments, the weather forecasting unit 323 uses the weather information acquired by the ECU 32 to forecast weather at the work site for a predetermined time period into the future and the adjusting unit 324 adjusts the time schedule in accordance with the weather forecast by the weather forecasting unit 323, but it is possible instead for the adjusting unit 324 to adjust the time schedule based on the weather information acquired by the information acquiring unit 322, omitting the weather forecasting unit 323. Therefore, the configuration of an adjusting unit is not limited to the above configuration.

In the above embodiments, the output unit 325 outputs the work-start command and work-stop command in accordance with the time schedule adjusted by the adjusting unit 324, these work commands are sent to the utility machine such as the lawn mower 1 or sprinkler 2 through a communication unit (communication units 11, 21 and 31), and the ECU 12 or 22 controls the actuators 13 and 14 or actuator 23 in accordance with the received work commands. However, as long as controlling the actuators so that the utility machine performs work in accordance with the adjusted time schedule, the configuration of an actuator control unit is not limited to the above configuration. For example, instead of the relay apparatus 3, the utility machine 1 or 2 can itself adjust a time schedule and control the actuators in accordance with the adjusted time schedule.

In the above embodiment (FIG. 5), the adjusting unit 324 adjusts the time schedule so that work by the lawn mower 1 is prohibited from a predetermined time period Δ1 before the rain start time t10 forecast by the weather forecasting unit 323 and work by the lawn mower 1 is prohibited until a predetermined time period Δ2 elapses after the forecast rain stop time t20, but the pattern of time schedule adjustment in response to the weather conditions is not limited to that described above.

In accordance with the present invention, a time schedule of a utility machine is adjusted based on weather information and an actuator is controlled in accordance with the adjusted time schedule, so that a rain detecting sensor or the like is not required and work can be performed by means of a simple and low-cost structure while taking weather conditions into account.

Above, while the present invention has been described with reference to the preferred embodiments thereof, it will be understood, by those skilled in the art, that various changes and modifications may be made thereto without departing from the scope of the appended claims.

What is claimed is:

1. A control apparatus for a utility machine configured to automatically work outdoors, comprising:
   a work actuator installed in the utility machine;
   a setting unit configured to set a time schedule of the utility machine in advance;
   an information acquiring unit configured to acquire current and future weather information for a work site or nearby;
   an adjusting unit configured to adjust the time schedule based on the weather information acquired by the information acquiring unit; and
   an actuator control unit configured to control the work actuator so that the utility machine works in accordance with a time schedule adjusted by the adjusting unit.

2. The apparatus according to claim 1, wherein the information acquiring unit is configured to acquire the weather information from a server through a network communication.

3. The apparatus according to claim 1, further comprising a weather forecasting unit configured to forecast current and future weather at the work site, based on the weather information acquired by the information acquiring unit,
   wherein the adjusting unit is configured to adjust the time schedule in accordance with the weather forecast by the weather forecasting unit.

4. The apparatus according to claim 3, wherein the weather forecasting unit is configured to forecast rain or no rain at the work site, and
   the adjusting unit is configured to adjust the time schedule so as to prohibit work by the utility machine during time periods rain is forecast by the weather forecasting unit.

5. The apparatus according to claim 4, wherein the weather forecasting unit is configured to forecast a rain start time at the work site, and
   the adjusting unit is configured to adjust the time schedule so as to prohibit work by the utility machine from a predetermined time period before the rain start time forecast by the weather forecasting unit.

6. The apparatus according to claim 4, wherein the weather forecasting unit is configured to forecast a rain stop time at the work site, and
   the adjusting unit is configured to adjust the time schedule so as to prohibit work by the utility machine until a predetermined time period elapses after the rain stop time forecast by the weather forecasting unit.

7. The apparatus according to claim 4, wherein the information acquiring unit is configured to acquire rain cloud information within a predetermined distance around the utility machine, the rain cloud information including a first cloud information in a first area within a first distance from the work site and a second cloud information in a second area within a second distance longer than the first distance from the work site, and
   the weather forecasting unit is configured to forecast the rain or no rain based on the first cloud information and the second cloud information.

8. The apparatus according to claim 1, further comprising a relay apparatus configured to communicate with the utility machine through a communication unit,
   wherein the relay apparatus includes the setting unit, the information acquiring unit, the adjusting unit, and an output unit configured to output a work command to the utility machine through the communication unit, and
   the actuator control unit is configured to output a control signal to the work actuator in accordance with the work command output from the output unit.

9. The apparatus according to claim 1, wherein the information acquiring unit is configured to acquire not only the current and future weather information but also past weather information for the work site or nearby, and
   the adjusting unit is configured to adjust the time schedule based on the past, current and future weather information acquired by the information acquiring unit.

10. The apparatus according to claim 1, wherein the utility machine is a lawn mower having a travel actuator, and
    the actuator control unit is configured to control the work actuator and the travel actuator so that the lawn mower travels autonomously and mows a lawn in a predetermined working area, in accordance with the time schedule adjusted by the adjusting unit.

11. The apparatus according to claim 1, wherein the utility machine is a sprinkler configured to sprinkle in a predetermined working area.

12. The apparatus according to claim 1, wherein the utility machine includes a lawn mower configured to travel autonomously and mow a lawn in a predetermined working area and a sprinkler configured to sprinkle in the predetermined working area,
    the setting unit is configured to set a time schedule of the lawn mower and a time schedule of the sprinkler in advance, and
    the adjusting unit is configured to adjust the time schedule of one of the lawn mower and the sprinkler in accordance with the time schedule of the other of the lawn mower and the sprinkler.

13. A control apparatus for a utility machine, the control apparatus comprising:

a work actuator and a central processing unit (CPU) installed in the utility machine; and a relay apparatus communicatively coupled to the utility machine;

the relay apparatus is configured to set a time schedule of the utility machine in advance, to acquire weather information for a work site, to adjust the time schedule based on the weather information, and to output commands to the CPU in the utility vehicle;

the CPU is configured to control the work actuator based on the commands so that the utility machine works in accordance with the time schedule as adjusted.

14. A control apparatus for a lawn mower that navigates autonomously, the control apparatus comprising:

a work actuator, travel actuators, and a central processing unit (CPU) installed in the lawn mower; and a relay apparatus communicatively coupled to the lawn mower via wireless signals;

the relay apparatus is configured to set a time schedule of the lawn mower in advance, to acquire weather information for a work site, to forecast weather at the work site for a period extending from a present time to a future time, to adjust the time schedule based on the weather forecast, and to output commands to the CPU in the lawn mower to comply with the time schedule as adjusted;

the CPU is configured to control the work actuator and the travel actuators to perform work in the work site in response to a work-start command from the relay apparatus, and to control the work actuator and the travel actuators to stop work in the work site in response to a work-stop command from the relay apparatus.

* * * * *